May 20, 1947. D. C. LANESE 2,420,959
COMBINED DRINK MIXER AND DISPENSER
Filed Oct. 19, 1945
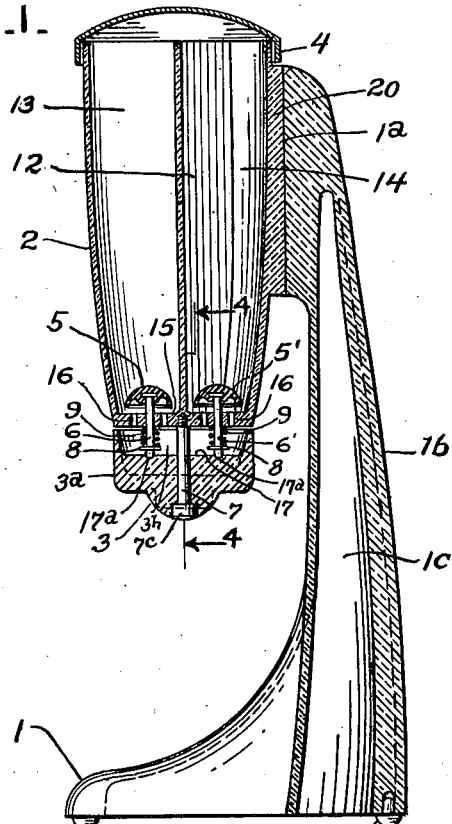
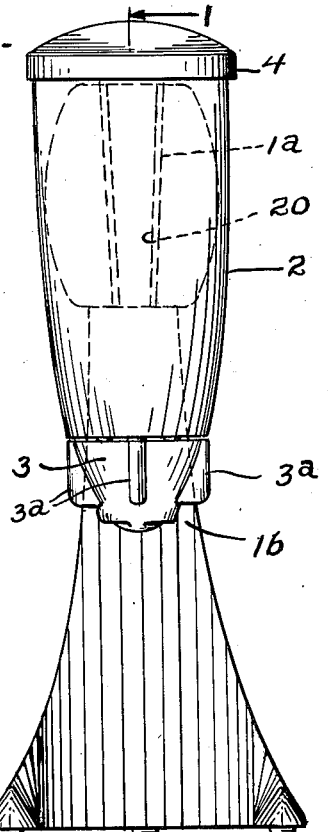
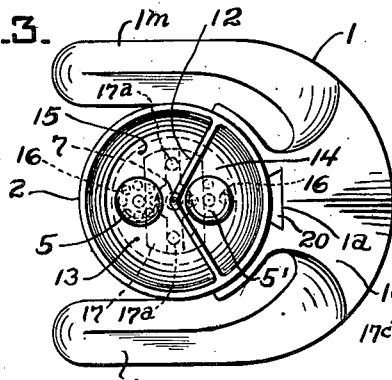
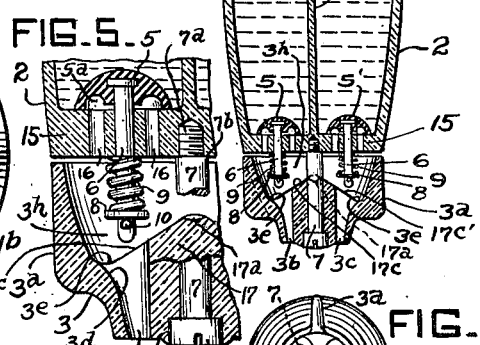
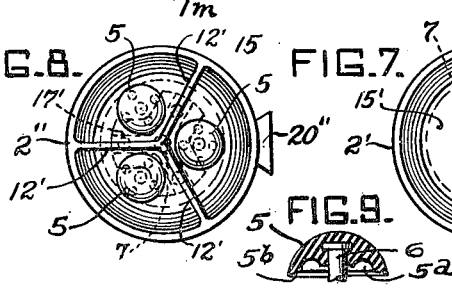
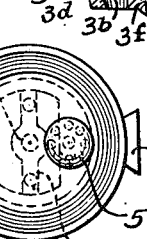
INVENTOR
DONALD C. LANESE
BY
Elbert R. Bronner
his ATTORNEY Patented May 20, 1947

2,420,959

UNITED STATES PATENT OFFICE 2,420,959

COMBINED DRINK MIXER AND DISPENSER

Donald C. Lanese, Scarsdale, N. Y.

Application October 19, 1945, Serial No. 623,193

3 Claims. (Cl. 225—26)

My invention relates to a combined drink mixer and dispenser, particularly to a dispensing device adaptable for home use, parties, receptions and the like, whereat cocktails are served.

One of the salient features of my invention is the valve and cam dispensing mechanism, in which duplicate spring-control valves are operated by a hand control dispensing member at the extreme bottom portion of the bowl from which the different kinds of liquor, alcoholic, non-alcoholic and flavored drinks, or as otherwise desired for making cocktails, is dispensed properly mixed.

Another salient feature of my invention is the arrangement of the divided compartments in the bowl or container, one compartment being about two-thirds of the capacity of the bowl, and the remaining compartment being about one-third of the capactiy of the bowl. At the bottom portion of these compartments are arranged rubber valves that raise and lower by means of a hand cam member located at the under portion of the bowl, the liquor in the larger compartment adapted to flow through eight apertures or holes, and the liquor or required liqueur contents in the smaller compartment adapted to flow through four similar apertures or holes, for the reason that the cocktail requires two-thirds liquor to one-third liqueur, or whatever may be required for the complete cocktail, thereby providing the correct amount of each through their respective apertures or holes, when the hand cam member is turned one quarter to the left or right, either way being optional. Therefore, if desired to increase the amount of drink in the cocktail, then by rotating the cam member one-quarter turn, whereat it may pause to suit the desired amount required for the served drink, and then turned another one-quarter turn, thereby releasing both valve stems off the cam portions simultaneously, and completing the intermittent cycle of the rubber valves within the separate compartments of the bowl.

Another important feature of my invention is the interchangeability of using bowls of different designs, such as a three compartment bowl, or a bowl without any compartment, but in either event, the cam and dispensing mechanism is the same.

Other features of my invention will appear as the description proceeds in the following specification, accompanied by the annexed drawing, in which Fig. 1 is a vertical sectional view of my combined drink mixer and dispenser, taken on line 1—1 of Fig. 2.

Fig. 2 is a front elevational view of my dispenser shown in Fig. 1.

Fig. 3 is a top plan view of my dispenser shown in Fig. 1 with cap-cover member removed, and valves closed as shown in Fig. 4.

Fig. 4 shows a fragmentary sectional view taken on line 4—4 of Fig. 1 but with the valves in their closed position.

Fig. 5 is an enlarged view of that portion shown in Fig. 4 to clarify the valve mechanism.

Fig. 6 shows an under plan view of the combined cam and dispensing member as shown in Fig. 2.

Fig. 7 is an alternative design of the bowl or container of my dispenser.

Fig. 8 is another alternative design of the bowl or container.

Fig. 9 shows an enlarged view, of the rubber valve, similar to that shown in Fig. 5, but in this instance, the rim portion is shown in its free and inoperative position.

Referring to the drawing, my combined drink mixer and dispenser consists of a base 1, which may be die-cast of aluminum or white metal, zinc, or any other suitable material, and has an upright bracket portion 1b hollowed out as at 1c, and at the top portion of the bracket 1b, a female dove-tail portion 1a is provided to secure a male dove-tail portion 20 of a vase-like bowl or container 2, which is set slightly below the top rim or open portion of the bowl 2, so that a cap-cover member 4 may be readily removed and replaced thereon. The base member 1 has diverging feet portions 1m which provides an enclosure for positioning the cocktail glass therein.

Attached to the bottom floor portion 15 of the bowl 2 is a combined cam and dispensing member 3, in which a shoulder screw-bolt 7 allows the cam member 3 to rotate freely therewith. Suitably arranged onto the floor 15 of the bowl 2 are rubber cup-like valves 5, each provided with a stainless steel stem 6, coil spring 9, washer 8, cotter pin 10, all made of stainless steel.

The bowl 2 has a V-shape partition 12 that provides a large size compartment 13 and a small size compartment 14, in this instance, the large size may be about two-thirds, and the small size one-third of the total capacity of the bowl 2, thereby making the usual proportion for the ordinary cocktails. However, this may vary.

The bottom floor 15 of the bowl is provided with apertures 16 that are arranged concentrically with the stem 6 of the valve 5, so that the hollow portion 5a will be over said apertures, thereby providing a yieldable rim portion 5b slightly tapered at 5d to make a tight seal when the rubber valve 5 is closed, as shown in Fig. 4 and Fig. 5. These apertures or holes 16 are proportioned eight for the large size compartment 13, and four for the small size compartment, so that a ridge-like portion 17 forming the apexed cam portion, will move the stems 6 and 6' upwardly when the cam member 3 is turned slightly, about one-quarter of the full turn, whereat it may pause, if a larger drink is desired, or may slip over the seat or flat portion 17a if a small amount of drink is required. The cam portion has its apexed sloping or inclining portions 17c terminating into the channels or troughs 3e so that all of the mixed drink will be dispensed through the discharge openings 3b and 3c in the extreme bottom portion of the cam member 3, and it is to be noted that each opening has a curved portion towards the outer wall portion of member 3, so there is free flowing of the drink during its dispensing operation.

The center pivotal screw-bolt 7 is firmly secured to the floor 15 of the bowl 2, by means of a reduced threaded portion 7a, and a shoulder fit at 7b thereto. The head of the bolt 7 fits in a shoulder portion of a counterbore portion 3f of the cam member 3, onto which it is free to rotate when desired to dispense a cocktail, all of which is clearly shown in Fig. 5.

My dispensing device may be adapted for different drinks other than alcoholic cocktails, but it is preferable for use as hereinbefore described. It is also adapted to interchange another bowl having three compartments, such as 2" shown in Fig. 8, or without any compartment as shown at 2' in Fig. 7, in which three different liquors may be mixed and dispensed by use of three valves, as by my device shown in Fig. 8, or all liquors may be mixed primarily and stored into the full chamber of the bowl 2' shown in Fig. 7, and dispensed with only one valve, but in either event, my valve and cam mechanism is the salient feature necessary to dispense the drink required.

All similar parts over the original form may have the same numeral primed singularly, double or more.

It is to be understood that all details of parts of my invention shown on the drawing, is merely illustrative, and reserve any change or alteration thereof, providing same comes within the scope of the appended claims.

What I claim as new and desire to secure by Letters Patent of the United States of America, is as follows:

1. In a combined drink mixer and dispenser of the character described, comprising in combination a base member having an upright bracket portion provided with a female tapering dove-tail or groove portion at the top thereof, a vase-like bowl member provided with a male tapering dove-tail portion secured into said female dove-tail or groove portion of said bracket portion of base, said bowl having a V-shape partition providing a small and a large size compartment on each side thereof, the floor portion of each compartment provided with a rubber-like sealing valve member secured onto a stem member extending and operable through said floor portion, apertures provided concentrically with said stem and normally sealed by said valve which is controlled by a compression spring onto underside of said floor portion, a cam and dispensing cap-like member secured by a center pivotal screw-bolt to underside of said floor portion, a ridge-like cam portion extending midway of a recessed portion within said cap-like member, said cam portion have diverging portions downwardly into trough-like portions on each side thereof, said trough-like portions provided with dispensing openings, said cap-like member adapted to be rotated by hand, whereby the ridge-like cam portion raises simultaneously each of said stem and valves in each compartment, from which liquor or fluids therein will flow through said apertures in predetermined proportions for the mixed drink that is dispensed through said openings in bottom of said cap-like member.

2. In a portable drink dispenser of the character described, a base member, a bowl member attachable and removable thereon, said bowl provided with one small and one large size compartment, said divided compartments having individual spring controlled valve members provided in the floor portion of each compartment thereof, a cam and dispensing cap-like member rotatably secured to the under portion of said floor portions, a ridge-like cam portion within a recess portion of said cap-like member, said cam portion having diverging portions downwardly into trough-like channels on each side thereof, dispensing openings provided in each of said trough-like portions, said floor portions of each compartment provided with apertures normally sealed by said spring controlled valve members, said cap-like member adapted to be rotated by hand, whereby a stem member of said valve members contacting the bottom portion of one of said trough-like portions are raised simultaneously by said cam portion, thereby opening said valves in which liquid contents within said compartments may pass therethrough and outwardly through said dispensing openings into a suitable receptacle thereat.

3. In a drink mixer and dispensing device of the character described, a base member having an upright bracket portion, a bowl member provided with a male dove-tail portion adjacent the top open portion thereof, said male dove-tail portion secured into a female dove-tail portion at the top portion of said bracket portion of said base member, said bowl being divided into compartments of a different size and capacity, rubber cup-like valves provided in the floor portion of each compartment, said valves normally sealing suitable port openings through each of said floor portions, said valves provided with a stem portion operative through openings in said floor portions, a cap and dispensing member rotatably secured to the bottom or floor portion of said bowl by means of a center shoulder bolt, said cap and dispensing member having a recessed chamber provided with dispensing openings and a cam portion therein, said stem portions of said valves being controlled by compression springs on the free ends adjacent the underside of said floor portions, said free ends engaging said cam portions when said cap and dispensing member is slightly rotated by hand which opens said valves for dispensing liquid contents of said compartments through said port openings into said recessed portion, whereat said liquid contents are mixed and dispense through said dispensing openings of said cap and dispensing member.

DONALD C. LANESE.

REFERENCES CITED

The following references are of record in the file of this patent:

UNITED STATES PATENTS

| Number | Name | Date |
| --- | --- | --- |
| 850,916 | Fitzibboun et al. | Apr. 23, 1907 |